United States Patent [19]

Itaya et al.

[11] Patent Number: 4,504,906
[45] Date of Patent: Mar. 12, 1985

[54] MULTIPROCESSOR SYSTEM

[75] Inventors: Hiroshi Itaya; Kenji Nakatsugawa, both of Tokyo, Japan

[73] Assignee: Anritsu Electric Company Limited, Tokyo, Japan

[21] Appl. No.: 445,611

[22] Filed: Nov. 30, 1982

[51] Int. Cl.³ ............................................. G06F 15/16
[52] U.S. Cl. ................................................. 364/200
[58] Field of Search ......................... 364/200 MS File

[56] References Cited

U.S. PATENT DOCUMENTS 4,141,067  2/1979  McLagan ........................... 364/200
4,404,628  9/1983  Angelo ............................... 364/200

Primary Examiner—Raulfe B. Zache
Attorney, Agent, or Firm—Jordan and Hamburg

[57] ABSTRACT

In a multiprocessory system comprising a plurality of CPUs interconnected by a common bus, means are provided whereby the CPUs are periodically and cyclically enabled to access the bus. Data transfer from one CPU to another is performed by first storing the data into a main memory connected to the bus, then transferring the data from main memory to the destination CPU when the latter is enabled to utilize the bus and is in a condition to accept the data. Means can also be provided whereby, when data must be immediately transferred from one CPU to another, the sending CPU stores the data in main memory, generates signals whereby the destination CPU is given use of the bus, and generates an interrupt which causes transfer of the stored data into the destination CPU.

3 Claims, 9 Drawing Figures

MULTIPROCESSOR SYSTEM

BACKGROUND OF THE INVENTION

The present invention relates to a multiprocessor system comprising a plurality of central processing units (hereinafter abbreviated to CPUs) which are interconnected by common bus means, i.e. a data bus and an address bus, in which data transfer between the CPUs must be performed at arbitrary timings.

It is frequently necessary to form a multiprocessor system (i.e. a data processing system comprising a number of CPUs which normally function independently of one another) in which the CPUs may be interconnected by means of a common bus, and in which data must be transferred from one CPU to another at arbitrary timings. Various types of such system have been proposed in the prior art, as will subsequently be discussed in detail. However all of such prior art systems suffer from certain disadvantages. Basically, these disadvantages are that it is generally necessary for the system to ascertain the operation conditions of all of the CPUs in the system before implementing a transfer of data from one CPU to another. Another disadvantage, particularly in the case of a system in which such transfers are controlled through transfer commands originating in a command register, without using a common bus, then the command control circuitry becomes extremely complex as the number of CPUs in the system is increased. Another disadvantage, common to all of such prior art systems, is that it is generally necessary to alter the configuration of each CPU and of the data transfer control circuits whenever new CPUs are added to the system. It is therefore difficult to expand the number of CPUs in such a prior art multiprocessor system.

The above disadvantages of the prior art are overcome by the present invention, which provides a multiprocessor system comprising a plurality of CPUs interconnected by a common bus and enables data to be transferred between CPUs without affecting the operation of other CPUs, which utilizes very simple control circuitry, and which can be easily expanded by addition of CPUs without alteration to the existing CPUs or the control circuitry.

SUMMARY OF THE INVENTION

A multiprocessor system according to the present invention comprises a plurality of CPUs which are interconnected by a common bus (comprising a data bus and an address bus), and a main memory which is also connected to the common bus. The term "main memory" as used herein and in the appended claims refers to some form of rapid access, high storage capacity memory means, generally implemented by core memory or large capacity RAM ICs, as opposed to a high capacity low access speed storage medium such as magnetic tape. Such a system further comprises a pulse generator for generating a train of signal pulses, a counter circuit which counts these signal pulses, and a decoder which decodes the count value in the counter circuit and generates code signals representing the current count value, i.e. the codes represented by the latter signals vary in a sequential cyclic manner as the counter circuit operates. In such a system, each of the CPUs comprises a microprocessor, a logic circuit section and bus driver circuits which couple the CPU to the common bus. Whenever one of the CPUs requires use of the common bus, in order to transfer data to or from some other CPU, then the microprocessor of that CPU generates request signal which is applied to the logic circuit. In this condition, when a particular code, specific to the latter CPU, is output from the decoder, then the CPU generates a signal (referred to herein as a bus available signal) which controls the bus driver circuits such as to enable data transfer into or out of that CPU. In this way, each of the CPUs is sequentially and cyclically interrogated as to whether use of the common bus thereby is necessary. It it is necessary, then that CPU acquires use of the common bus, and data transfer is performed over the bus.

To transfer data from one CPU to another, with such a system, the sending CPU first emits a signal requesting use of the common bus, and when this use is enabled, transmits the requisite data over the common bus to be stored in the main memory. Subsequently, when the destination CPU is in a condition to accept the stored data and has acquired use of the common bus by the process described above, then the data is transferred from the main memory over the bus into the destination CPU. It can thus be understood that the sending CPU can quickly transmit data for transfer to another CPU, with this data being temporarily stored in the main memory, and can then continue with other work, and that the operation of the other CPUs is not affected by this transfer of data into storage in the main memory. In addition, the destination CPU can have the data which is stored in the main memory transferred thereto at some suitable timing with regard to its own operation, i.e. can continue a current task until transfer in of the stored data is required.

Means can also be provided in such a system whereby, when data must be immediately transferred from one CPU to another (i.e. without waiting for the destination CPU to complete a current task and request use of the bus for data transfer thereto, and acquire use of the bus when the corresponding code is generated by the decoder as described above), the sending CPU acts to set a count value into the counter circuit such that the code corresponding to the destination CPU is output from the decoder. This is performed after the sending CPU has transferred the requisite data to be stored in the main memory. With the destination CPU now having acquired use of the common bus, the sending CPU transmits an interrupt notification signal to the destination CPU, causing the latter to immediately enter an interrupt routine to transfer the stored data thereto over the common bus. If such immediate data transfer is not required, on the other hand, then it is carried out by the process described in the preceding paragraph. In this way, it can be ensured that a data transfer by a CPU will only affect the operation of another CPU when it is absolutely necessary for immediate data transfer to another CPU to be implemented.

As will be understood from the description of the preferred embodiments given hereinafter, the circuits for controlling the operation of a multiprocessor system according to the present invention can be extremely simple, and the system can be expanded by addition of CPUs without alteration to the circuit configurations of the existing CPUs or the control circuits.

BRIEF DESCRIPTION OF THE DRAWINGS

FIGS. 8 and 8A and 8B are block circuit diagram illustrating the configuration of each of the CPUs and of a CPU control circuit section used in the second embodiment.

DESCRIPTION OF THE PREFERRED EMBODIMENTS

Figure 1:
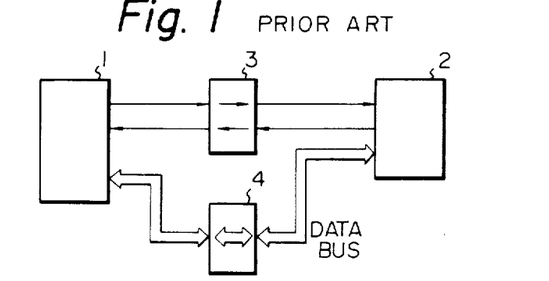
FIG. 1, FIG. 2 and FIG. 3 are diagrams for illustrating three prior art methods of performing data transfer between CPUs of a multiprocessor.
Figure 2:
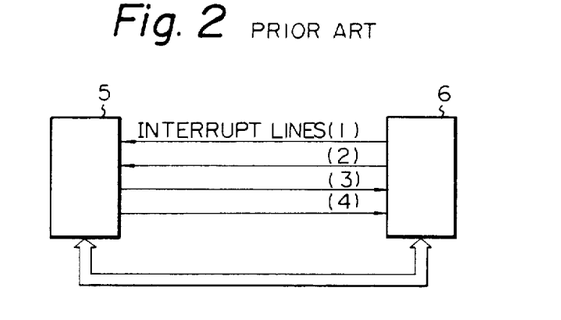
Figure 3:
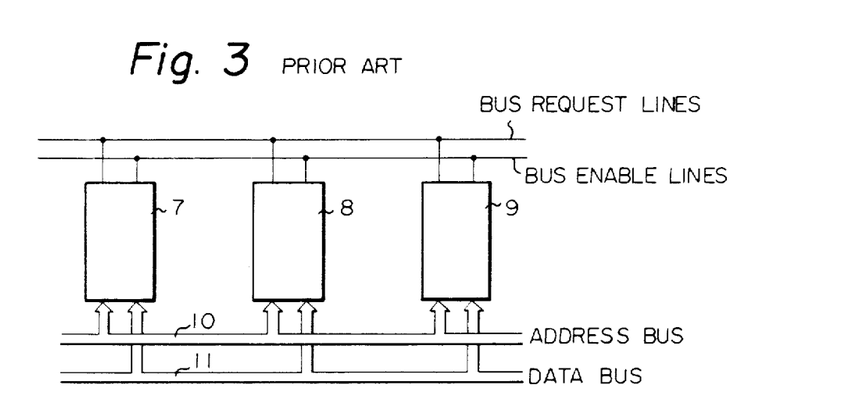

FIG. 1 to FIG. 3 are diagrams for illustrating three prior art methods utilized for transfer of data between processors, or between units of a multiprocessor. In the case of the method illustrated in FIG. 1, data transfer is controlled by means of transfer commands. For example, if data is to be transferred from processor unit 1 to processor unit 2, then a command indicating the control mode is sent from processor unit 1 to processor unit 2 via a command register 3. Data can thereby be transferred bidirectionally between processor units 1 and 2 via a bi-directional bus driver circuit 4. With such a method, it is necessary to provide a large amount of capacity in command register 3, and to increase the size of this register if any new processor units are added to the system. Another disadvantage of such a system is that, while data is being transferred from one processor unit to another, e.g. from processor unit 1 to processor unit 2, processor unit 2 cannot proceed with any other task.

In the case of the method illustrated in FIG. 2, interrupt lines, denoted as (1) to (4) are provided between the processor units of the system. If processor unit 5 is assumed to be the master processor unit, and generates an interrupt to cause data to be transferred therefrom into processor unit 6, then processor unit 6 cannot perform any other task while such a data transfer is in progress. In addition, with such a method, the control circuits for processing the interrupts become increasingly complex as the number of processor units is increased, making it difficult to add new processor units to such a system.

With the method which is illustrated in FIG. 3, a common bus is utilized, comprising an address bus and a data bus in this example. Such a system has the disadvantage that when for example data is being transferred by processor unit 7 to processor unit 8, then since address bus 10 and data bus 11 are in use, processor unit cannot transmit data to any other processor unit. In other words, it is necessary to provide some means for controlling data transfer to and from each processor unit in accordance with the current operating conditions of all of the other processor units. Thus, control of data transfer between units requires complex circuitry, and it is therefore difficult to add new processor units to such a system, due to the need for modifications in the circuits of the existing processor units and control means.

Figure 4:
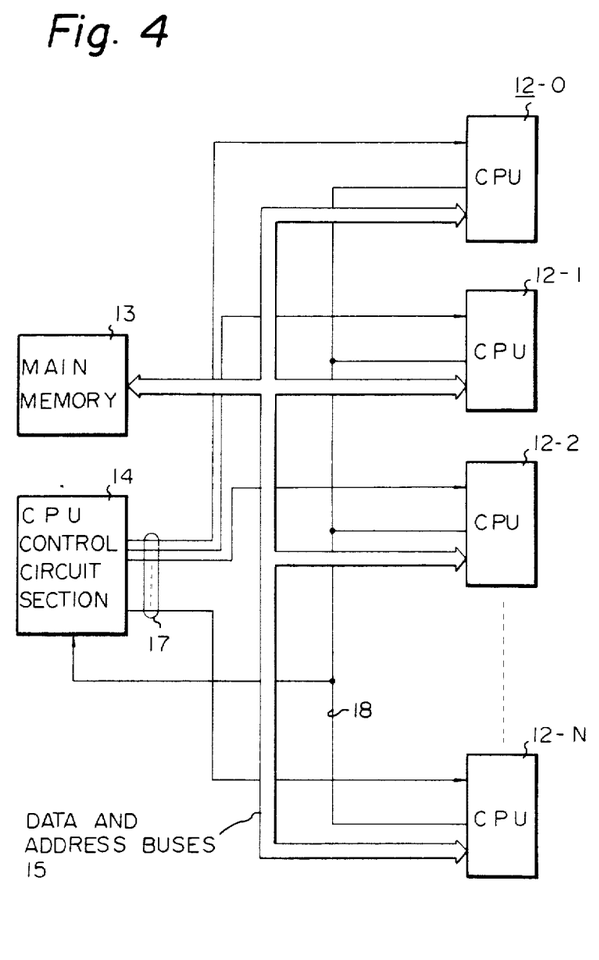
FIG. 4 is a block circuit diagram showing the general configuration of a first embodiment of a multiprocessor system according to the present invention.

Referring now to FIG. 4, a first embodiment of a multiprocessor system according to the present invention is illustrated, as a simplified general block system diagram. Designations 12-0 to 12-N represent processor units, i.e. CPUs, each of which incorporates a microprocessor. Numeral 13 denotes a main memory, used to temporarily store data which is transferred from one of the CPUs, for input to another of the CPUs 12-0 to 12-N. Numeral 14 denotes a CPU control circuit section 14 which serves to transmit signals assigning permission for each CPU to use a common bus 15. Common bus 15, comprising a data bus and address bus, serves to transfer data to the CPUs into main memory 13 and from main memory 13 into the CPUs, and for transferring addresses for access to main memory 13. Numeral 17 denotes a set of control lines, over which signals are transmitted to assign permission for each of the CPUs 12-0 to 12-N to use common bus 15, with these signals representing codes and being generated in a sequentially varying cyclic manner as described hereinafter. Numeral 18 denotes a control line over which signals are sent from the CPUs 12-0 to 12-N to CPU control circuit section 14, which indicate that one of the CPUs has acquired use of the common bus for transfer of data. Such a signal controls the operation of CPU control circuit section 14 such that the signals output on lines 17 are held in a static condition until the termination of such a signal on control line 18, as described hereinafter, so that a CPU which is performing a data transfer retains use of the common bus 15 until such a data transfer has been completed.

Thus for example if CPU 12-1 has to transfer data into CPU 12-0, then firstly, when CPU 12-1 acquires use of data bus 15, the data concerned is transferred from CPU 12-1 over common bus 15 to be stored in main memory 13. Thereafter, at a time which is suitable for inputting this data to CPU 12-0 (e.g. upon completion of some task by CPU 12-0), and when the code which is sent out on control lines 17 is that designating permission for CPU 12-0 to utilize common bus 15, the data previously stored in main memory 13 from CPU 12-1 is transferred therefrom over common bus 15 to be input to CPU 12-0.

In this way, CPU 12-0 can execute its current task at the time of transfer of data out of CPU 12-1 without interference, until completion of that task, and can acquire the latter data at some subsequent suitable time. On the other hand, CPU 12-1 can immediately execute a transfer of data destined for CPU 12-0, when that data has been generated in CPU 12-1 with a CPU 12-1 then proceeding with another task when the latter data has been stored in main memory 13. It can thus be understood that transfer of data between CPUs can be carried out in a manner which does not interfere with the current operation of any CPU.

Figure 5:
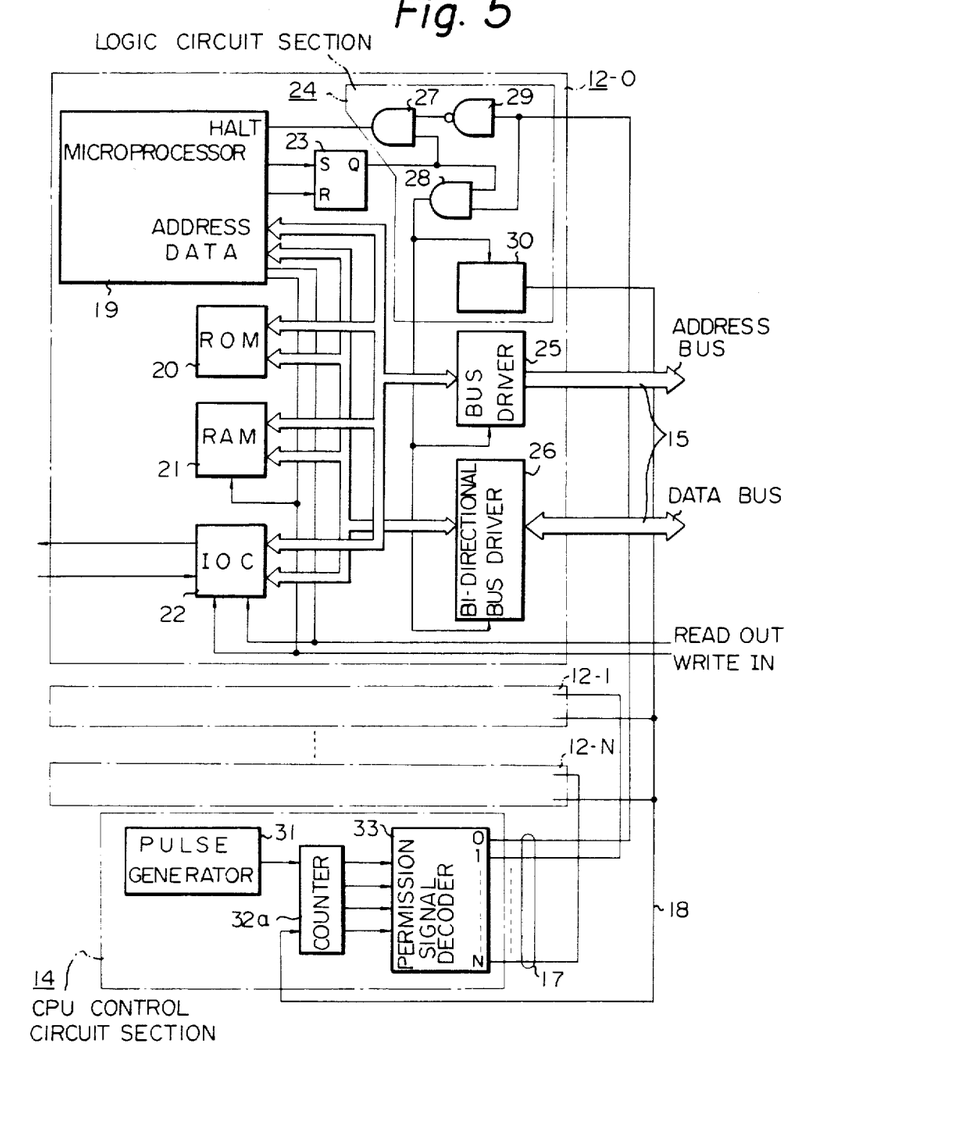
FIG. 5 is a block circuit diagram illustrating the configuration of each of the CPUs and of a CPU control circuit section used in the first embodiment.

This embodiment will now be described in greater detail with reference to FIG. 5, which illustrates the configuration of one of the CPUs, i.e. 12-0, and of CPU control circuit section 14. Each of the CPUs 12-1 to 12-N has an identical configuration to that shown for CPU 12-0. Numeral 19 denotes a microprocessor 19 which outputs command signals for accessing data in main memory 13, etc. Numeral 20 denotes a ROM, numeral 21 a RAM, and numeral 22 an input/output control unit. Numeral 23 denotes a flip-flop which produces as output from terminal Q a bus usage request signal. In the following description it will be assumed that a signal is generated as a logical high level state (abbreviated hereinafter to H level), as opposed to a logical low level state (abbreviated hereinafter to L level). The bus usage request signal is initiated by a command signal pulse emitted from microprocessor 19 which sets flip-flop 23, the latter command signal indicating that data is to be transferred into or out of the corresponding CPU over common bus 15. A subsequent command signal pulse emitted from flip-flop 23, produced upon completion of transfer of data to or from the corresponding CPU (i.e. in this case CPU 12-0) acts to reset flip-flop 23 and thereby terminate the bus usage request signal.

Numeral 24 denotes a logic circuit section which comprises AND gates 27 and 28 and a NAND gate 29 (here, used simply as an inverter). A usage permission code signal which is output from CPU control circuit section 14 is applied over one of lines 17 to the input of NAND gate 29 and to one input of AND gate 28. The output of NAND gate 29 is applied to one input of AND gate 27, while the Q output of flip-flop 23 (i.e. the bus usage request signal is applied to the other inputs of AND gate 27 and 28. An output signal from AND gate 28, designated as a bus available signal, serves to control the operation of a unidirectional bus driver circuit 25 (herinafter referred to simply as a bus driver circuit 25) and a bi-directional bus driver circuit 26, which control the transfer of addresses and of data, respectively, between CPU 12-0 and main memory 13 over common bus 15. Numeral 30 denotes a tri-state element 30, which is coupled to receive the bus available signal from AND gate 28, with the output of tri-state 30 going from the L to the H level in response to the bus available signal. The outputs of each of the tri-state elements corresponding to tri-state element 30, in the CPUs 12-0 to 12-N are connected in common to control line 18, and have operating characteristics such that control line 18 is normally at the H level, and is set to the L level if the output of any one of these tri-state elements 30 etc. goes to the L level.

CPU control circuit section 14 comprises a pulse generator 31, which produces a continuous train of signal pulses, a counter circuit 32, which counts pulses from pulse generator 31, and a permission signal decoder 33 which is coupled to counter circuit 32 and acts to decode the count value therein and produce corresponding usage permission code signals as outputs, which are sent to CPUs 12-0 to 12-N over lines 17. In this embodiment, for a particular code output produced from decoder 33, a specific one of CPUs 12-0 to 12-N is given "permission" to utilize common bus 15, if this use is currently required. Thus, when the "0" output of decoder 33 is at the H level and all other outputs "1" to "N" at the L level, AND gate 28 in CPU 12-0 is enabled to produce a bus available signal, if a bus usage request signal is currently being output from flip-flop 23. At the next change in count by counter circuit 32, the "1" output of decoder 33 goes to the H level and all other outputs to the L level, and in this state CPU 12-1 is enabled to use common bus 15, if such use is currently required. The output signals from decoder 33 will be referred to herein as usage permission code signals, and it can be understood from the above that these signals sequentially and cyclically "interrogate" the CPUs 12-0 to 12-N as to whether use of common bus 15 is required. If such use is required by a CPU, as indicated by issuance of a bus usage request signal therein, then a corresponding bus available signal is generated, causing that CPU to be coupled to common bus 15 and causing the control line 18 to be set to the H level.

A control terminal 32a is provided in counter circuit 32 of CPU control circuit section 14, coupled to control line 18. When control line 18 is set to the L level as a result of a bus available signal being generated by one of CPUs 12-0 to 12-N, then this L level input to control terminal 33a causes counting by counter circuit 32 to be halted, whereby permission signal decoder 33 is held in a static operating state, with the usage permission code signal corresponding to the CPU issuing the bus available signal being held maintained. In other words, if for example CPU 12-0 emits a bus available signal from logic circuit section 24 in response to the corresponding usage permission code signal at the H level being applied to AND gate 28, then the latter H level input will be maintained thereafter, until counting by counter circuit 32 resumes. This resumption will occur when the bus usage request signal from flip-flop 23 is terminated, so that output from tri-state element 30 of CPU 12-0 resets control line 18 to the H level. In this way, once a CPU has acquired use of the common bus 15 as described above, this use is maintained exclusively by that CPU until data transfer thereby over common bus 15 has been completed. Counting by counter circuit 32 is then resumed and continued until some CPU again requires to perform a data transfer, whereupon counting is halted and the latter CPU acquires exclusive use of common bus 15 until that data transfer is completed.

In this way, the CPUs 12-0 to 12-N are, in effect, sequentially and cyclically "interrogated", to determine whether use of common bus 15 for data transfer, using main memory 15 as an intermediary, is required.

If a microprocessor, e.g. microprocessor 19 of CPU 12-0, generates a bus usage request signal from flip-flop 23 at a time when common bus 15 is currently being utilized by another of CPUs 12-0 to 12-N, then at this time the corresponding usage permission code signal input to AND gate 29 will be at the L level, so that an H level input will be applied to AND gate 27 from NAND gate 29. An H level output, referred to herein as a halt command signal, is thereby output from AND gate 27, and input to a HALT terminal of microprocessor 19, thereby acting to halt operation of microprocessor 19, and to set CPU 12-0 into a waiting state. This halt condition is continued until use of common bus 15 by the other CPU has been completed, whereupon counting by counter circuit 32 is resumed. The usage permission code signal for CPU 12-0 will then go to the H level, thereby terminating the halt state of microprocessor 19, by ending output of the halt command signal from AND gate 27. CPU 12-0 has now acquired use of common bus 15, as described in the above.

Figure 6:
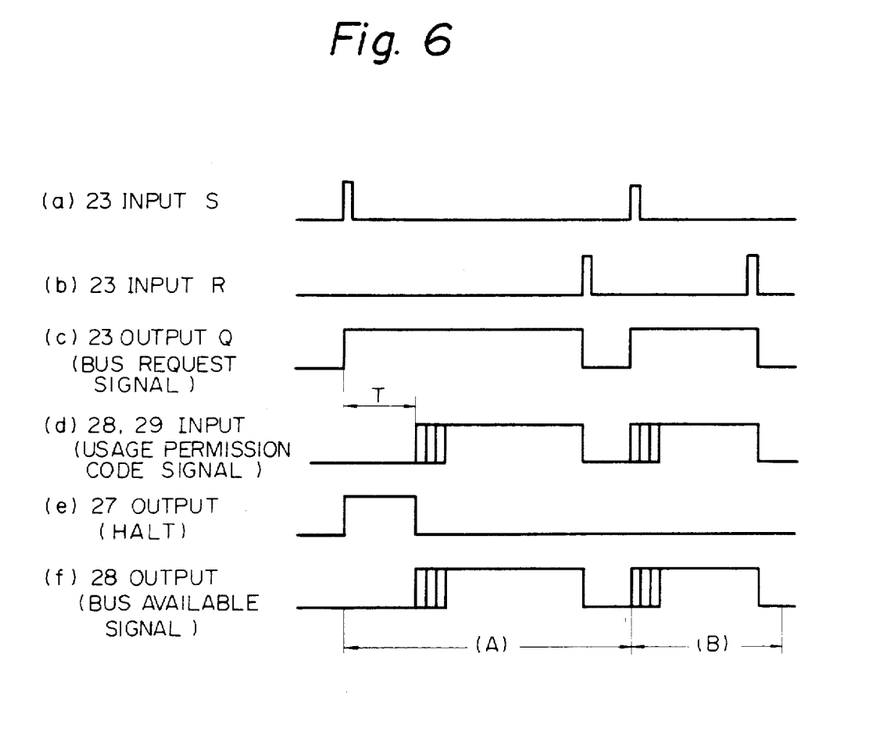
FIG. 6 is a timing chart for illustrating the relationship between various signals in the embodiment of FIG. 4 and FIG. 6.

The various operations described above are illustrated in the timing diagram of FIG. 6, in which FIG. 6(a) shows command signal pulses output from microprocessor 19 and applied to a set terminal S of flip-flop 23, FIG. 6(b) shows command signal pulses output from microprocessor 19 and applied to the reset terminal R of flip-flop 23, FIG. 6(c) shows the Q output from flip-flop 23, i.e. the bus usage request signal, FIG. 6(d) shows the input to AND gate 28 and NAND gate 29, i.e. the usage permission code signal, FIG. 6(e) shows the output from AND gate 27, i.e. the halt command signal, and FIG. 6(f) shows the output from AND gate 28, i.e. the bus available signal. During the portion of FIG. 6 denoted as (A), a bus usage request signal is issued by a CPU at a time when common bus 15 is being utilized by some other CPU in the system, so that a halt signal is generated, which continues until common bus 15 is released and counting by counter circuit 32 resumes. During the portion denoted as (B), a bus usage request signal is issued by a CPU at a time when no other CPU is currently utilizing the common bus 15, so that no halt signal is generated and the requesting CPU acquires use of common bus 15 as soon as the corresponding usage permission code signal has been output from decoder 33.

Figure 7:
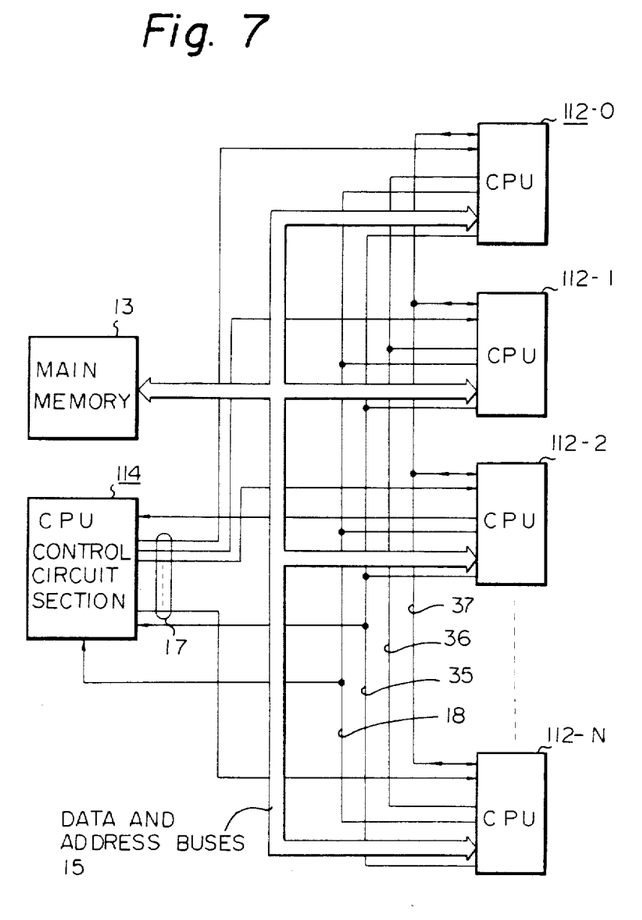
FIG. 7 is a block circuit diagram illustrating the general configuration of a second embodiment of a multiprocessor system according to the present invention.

A second embodiment of the present invention will now be described, with reference first to FIG. 7. The second embodiment is basically similar to the first, described above, but is further provided with means whereby a CPU in the multiprocessor system can initiate an immediate transfer of data to another CPU in the system if necessary, interrupting the task currently being performed by the destination CPU. If such an immediate data transfer is not required, then data is transferred in the manner described for the first embodiment, i.e. without such transfers affecting the current operations of the CPUs. In FIG. 7, numerals 113, 15, 17 and 18 denote a main memory, common bus and control lines corresponding to those in the first embodiment. Numeral 114 denotes a CPU control circuit section while designations 112-0 to 112-N denote a plurality of CPUs. Numeral 35 denotes a set of lines connected in common, over which code signals corresponding to a destination CPU are sent to CPU control circuit section 114, and preset into a counter therein, when data transfer by an interrupt is to be performed. Numeral 36 denotes a control line over which counter preset signals are applied from a CPU requesting data transfer by an interrupt, such preset signals acting to set the code of a destination CPU onto lines 17. Numeral 37 denotes a set of interrupt lines, over which interrupt notification signals are sent from a sending CPU to a destination CPU, when data transfer by an interrupt is performed.

Figure 8A:
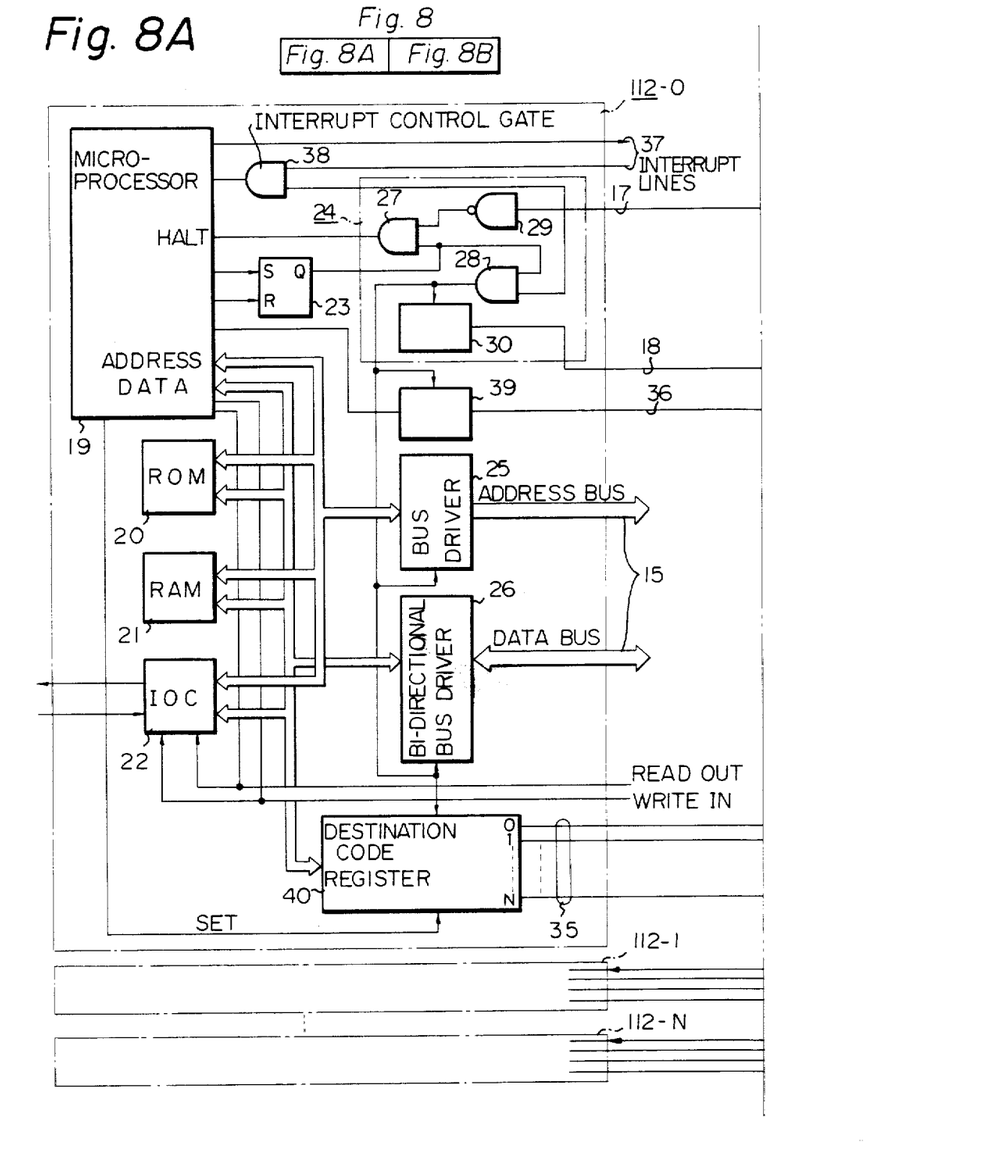
Figure 8B:
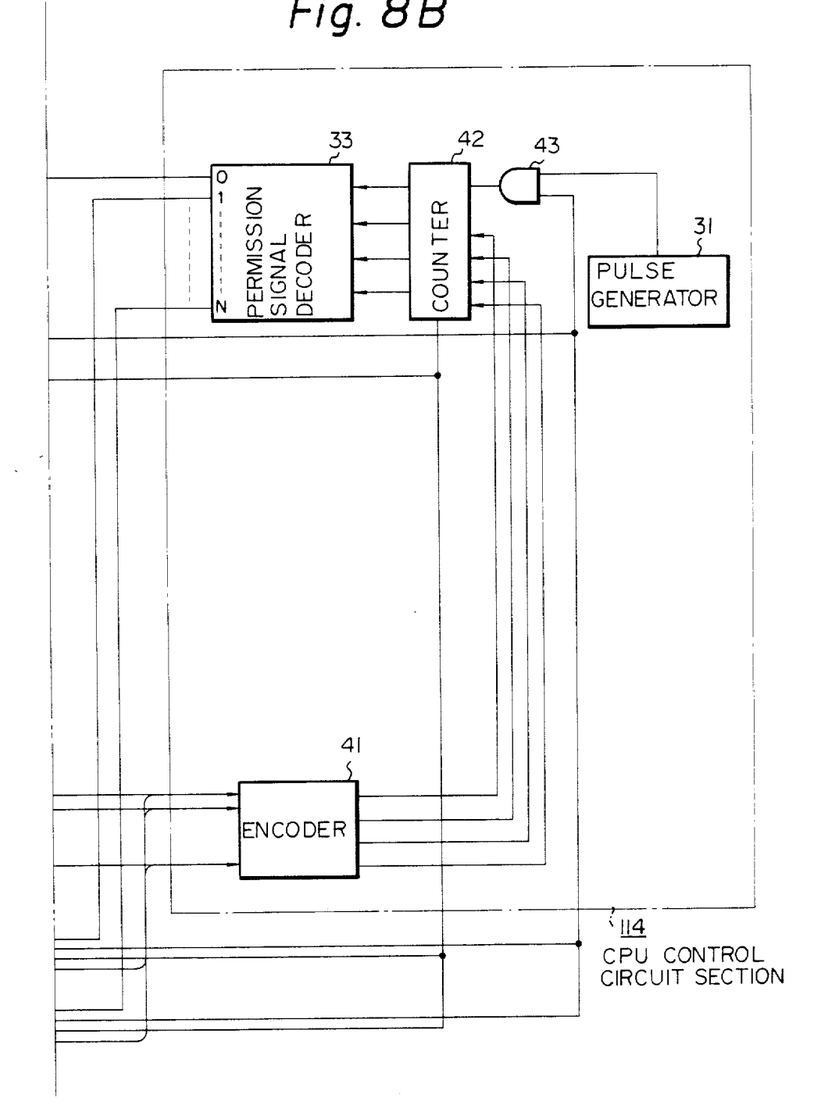

A more detailed description of this embodiment will now be given with reference to FIG. 8, in which the circuit configuration of one of the CPUs, i.e. CPU 112-0, is shown together with the configuration of CPU control circuit section 114. Each of CPUs 112-0 to 112-N has an identical configuration to CPU 112-0. In FIG. 8, reference numerals identical to those in FIG. 5 designate identical components or lines to the first embodiment. Numeral 40 denotes a destination code register, into which the code corresponding to a destination CPU is set, in the event of data transfer from CPU 112-0 by an interrupt being required. Code output signals from code register 40 are applied over a set of lines 35 to an encoder 41 in CPU control circuit section 114, and thereby encoded to produce count value signals, which are input to counter circuit 42. In this embodiment, destination code register 40 is made up of tri-state elements, so that the outputs thereof can be coupled in common to corresponding outputs of the destination code registers in the other ones of CPUs 112-0 to 112-N. Numeral 39 denotes a tri-state gate circuit which functions as an AND gate, such that when a bus available signal is being output from AND gate 28, and a counter preset signal pulse is emitted by microprocessor 19, the output of tri-state circuit 39 momentarily sets control line 36 to the H level, thereby setting the count value signals from encoder 41 into counter circuti 42. This count value is decoded by permission signal decoder 33, whereby the usage permission oce of a destination CPU is output from decoder 33. Numeral 38 denotes an interrupt control gate, which is coupled to receive interrupt signals from any other one of CPUs 112-0 to 112-N, over interrupt lines 37, while another of interrupt lines 37 is coupled from an interrupt signal output of microprocessor 19 to inputs of the interrupt control gates in the other CPUs of the system.

Numeral 43 denotes an AND gate which serves to control the transfer of pulses from pulse generator 31 to be counted by counter circuit 42, AND gate 43 being enabled when control line 18 is at the H level, i.e. when no bus available signal is being generated by any of CPUs 112-0 to 112-N, and being set to the inhibited when control line 18 is at the L level, i.e. when a bus available signal is being produced by any CPU in the system.

The operation of this embodiment will now be described. Normally, the operation is identical to that described for the first embodiment, with usage permission code signals corresponding to each of the CPUs 112-0 to 112-N being successively and cyclically output over lines 17. In the event that a CPU must immediately transfer data to another CPU in the system which is may be currently engated in a task, then the sending CPU, upon acquiring use of common bus 15, transmits the required data to be stored in main memory 13. The sending CPU then sets the code corresponding to the destination CPU into destination code register 40, and outputs a counter preset signal, which causes the count value signals from encoder 41 to be set into counter circuit 42, as the count value therein. The usage permission code signals for the destination CPU is thereby output from decoder 33. If for example CPU 112-0 is assumed to be the destination CPU, then an H level input will be applied as the usage permission code signal, to inputs of AND gate 30, NAND gate 29 and interrupt control gate 38. At the same time, the sending CPU emits an interrupt notification signal, which is transferred over the interrupt lines 37, through interrupt control gate 38, to thereby initiate an interrupt by microprocessor 19. As a result of this interrupt, microprocessor 19 initiates operation (e.g. by entering an interrupt routine) which result in a bus usage request signal being output from flip-flop 23, so that a bus available signal is thereby output from AND gate 28. In this way the destination CPU (i.e. in this case CPU 112-0) has now acquired use of the common bus 15 and can transfer the data, previously stored in main memory 13 from the destination CPU, into the destination CPU.

In this way, when it is necessary for an immediate data transfer to be performed, the task currently being performed by the destination CPU is interrupted, and the requisite data rapidly transferred to the destination CPU, by the intermediary of main memory 13.

Thus, the present invention enables a multiprocessor system comprising a plurality of CPUs interconnected by a common bus to be implemented, in which data transfer between the CPUs over the common bus can be carried out without interference with the operation of other CPUs, by means of temporary storage of such data in a main memory. In such a system, each CPU is periodically interrogated as to whether a data transfer into or out of that CPU over the common bus is required, and acquires immediate use of the bus if necessary. Furthermore it is possible to provide means whereby, if immediate data transfer from one CPU in the system to another in the system is required, the sending CPU issues an interrupt signal which causes the current task of the destination CPU to be interrupted and the data to be immediately transferred thereto, after temporary storage in the main memory. It will be apparent from the above description that the control circuit arrangements for such a system can be extremely simple, and that no modification to the configuration of existing CPUs, and little or no modification to the control circuit configuration, will be required in the event of system expansion by addition of new CPUs.

Although the present invention has been shown and described with reference to specific embodiments, it should be noted that various changes and modifications to these embodiments may be envisaged, which fall within the scope claimed for the present invention. The above description should therefore be interpreted in a descriptive and not in a limiting sense.

What is claimed is:

1. A multiprocessor system, comprising:
    pulse generator means for generating a train of signal pulses;
    counter circuit means coupled to count said signal pulses from said pulse generator means;
    permission signal decoder means coupled to said counter circuit means and responsive to successive count values therein for generating successively varying usage permission code signals;
    common bus means;
    main memory means;
    a plurality of central processing units which are coupled to one another and to said main memory means by said common bus means, each of said central processing units comprising at least a microprocessor, a logic circuit section, and bus drive means coupled to said common bus means, each of said central processing units being coupled to receive said usage permission code signals from said permission signal decoder means, each of said microprocessors being operable to initiate generation of a bus usage request signal when access to said common bus means is required for transfer of data between the corresponding central processing unit and another one of said central processing units, and acting to terminate said bus usage request signal when said data transfer is completed, each of said logic circuit sections being responsive to generation of said bus usage request signal by the corresponding microprocessor in conjunction with input of a corresponding one of said usage permission code signals for generating a bus available signal, said bus available signal acting on said bus drive means such as to enable data transfer into and out of the corresponding central processing unit over said common bus means;
    said counter circuit means having a control terminal coupled in common to all of said central processing units and responsive to generation of said bus available signal by any of said central processing units for halting counting by said counter circuit means until termination of said bus available signal, whereby said permission signal decoder means continues to apply to a central processing unit which is generating said bus available signal the corresponding usage permission code signals, until termination of said bus available signal, whereupon counting by said counter circuit resumes and consecutive cyclic variation of said usage permission code signals from said permission signal encoder means is resumed.

2. A multiprocessor system according to claim 1, in which said logic circuit section in each of said central processing units is responsive to said bus usage request signal, in the absence of input of said corresponding usage permission code signals, for producing a halt command signal, said halt command signal being operative to set the corresponding microprocessor in a halt condition until termination of said halt command signal.

3. A multiprocessor system according to claim 1, in which each of said central processing units further comprises interrupt control gate means, destination code register means, and means for generating a counter preset signal at a time subsequent to storage of data from that central processing unit into another one of said central processing units and means for outputting an interrupt notification signal at the latter time, and in which said multiprocessor system further comprises interrupt lines coupled in common to said plurality of central processing units and encoder means coupled in common to receive signals from the destination code register means of said plurality of central processing units and having outputs thereof coupled to said counter circuit means;
    each of said microprocessors acting, when immediate transfer of data stored from the corresponding central processing unit into said main memory means to said another central processing unit is necessary, to set a destination code corresponding to said another central processing unit into said destination code register means, said destination encoder means acting to convert said destination code into count value signals, said counter preset signal acting to set a count value determined by said count value signals into said counter circuit means whereby said usage permission decoder means generates permission code signals corresponding to said another central processing unit so that the logic circuit section thereof generates said bus available signal, the interrupt gate control means of said another central processing unit being responsive to said corresponding usage permission code signals for transferring said interrupt notification signal from said interrupt lines to the microprocessor of said another central processing unit, to thereby initiate transfer of the data stored in said main memory into said another central processing unit.

* * * * *